Patented Feb. 13, 1945

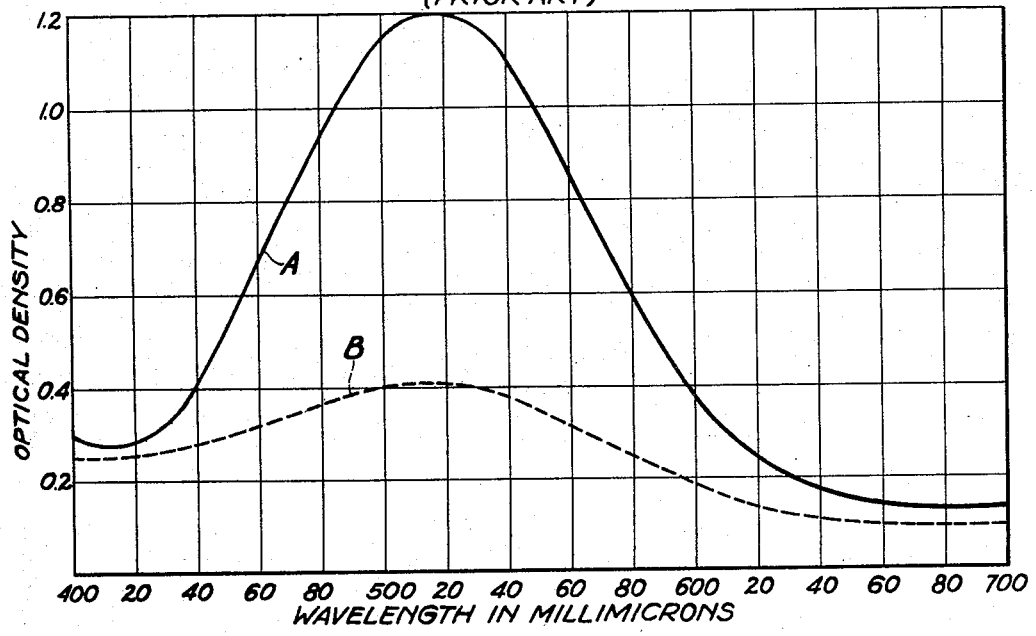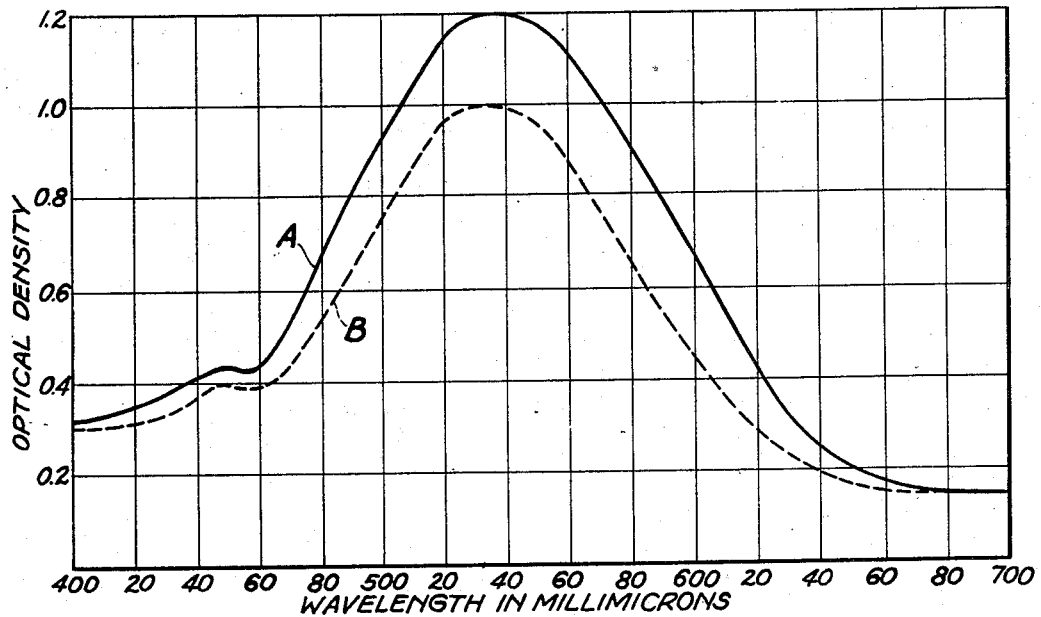

2,369,489

UNITED STATES PATENT OFFICE 2,369,489

ACYLATED AMINO PYRAZOLONE COUPLERS

Henry D. Porter and Arnold Weissberger, Rochester, N. Y., assignors to Eastman Kodak Company, Rochester, N. Y., a corporation of New Jersey Application September 4, 1942, Serial No. 457,276

16 Claims. (Cl. 95—6)

This invention relates to photographic color forming compounds and particularly to color forming coupler compounds comprising acyl-substituted amino pyrazolones.

This application is a continuation-in-part of our application Serial No. 412,244, filed September 25, 1941, now Patent 2,343,702, granted March 7, 1944.

The formation of colored photographic images by coupling the development product of aromatic amino developing agents with color forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols, depending upon the composition of the coupler and of the developer.

The principal disadvantages which have been encountered in the use of dyes of this type are undesirable light transmission characteristics and instability of the dyes to heat and light. The most desirable dyes would be those which transmit two of the primary colors completely and absorb the third primary color completely. For example, the magenta dye should absorb green light completely and transmit blue and red light completely. It should retain these transmission characteristics over a long period of time and should withstand reasonable exposure to heat and light without appreciable fading or loss of its light transmission characteristics. Many of the available couplers, however, have not produced dyes having these desirable characteristics.

It is, therefore, an object of the present invention to provide novel photographic coupler compounds producing dyes which have desirable properties with respect to heat and light stability. A further object is to provide novel couplers capable of producing magenta dye images in photographic emulsion layers. A still further object is to provide novel couplers capable of producing magenta dyes in photographic layers having the desired light transmission characteristics for color photography. A still further object is to provide couplers capable of incorporation in photographic emulsion layers. Other objects will appear from the following description of our invention.

These objects are accomplished, according to our invention, by the use, as coupler compounds, of certain acylated pyrazolones which we believe have the following general formula:

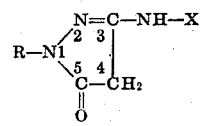

in which
R = a substituted or unsubstituted aryl group
X = an acyl group.

In the accompanying drawing, Fig. 1 is a graph showing the effect of heat and light on a dye produced from a prior art coupler and Fig. 2 is a graph showing the effect of heat and light on a dye produced from a coupler of the present invention.

Our novel coupler compounds are prepared by acylating pyrazolone derivatives which we believe to be 1-aryl-3-amino-5-pyrazolones. The 3-amino-5-pyrazolone intermediates may be made in various ways. For example, an ethyl oxalacetate aryl hydrazone may be converted to the 1-aryl-3-carbethoxy-5-pyrazolone (Annalen der Chemie, 246, 319), this compound converted to the hydrazide and azide, and the latter subjected to a Curtius degradation, as described in Journal of the American Chemical Society, vol. 64, 1942, page 2133.

Another method which may be used to produce the unacylated intermediate is that described by Conrad and Zart, Berichte, 39, 2287 (1906). According to Conrad and Zart, the compound produced is a 1-aryl-3-hydroxy-5-pyrazolone imide. We believe that the conclusions of Conrad and Zart with respect to the formulation of their compound, are erroneous, but whatever the formula of the compound which they produced, it is suitable as an intermediate in our process.

Compounds illustrating our invention are as follows:

(1) 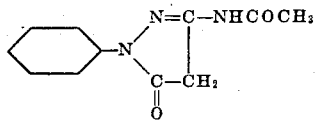

1-phenyl-3-acetylamino-5-pyrazolone (2) 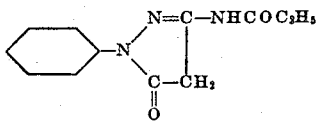

1-phenyl-3-propionylamino-5-pyrazolone (3) 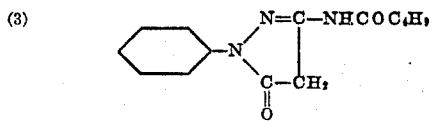
1-phenyl-3-n-valerylamino-5-pyrazolone (4) 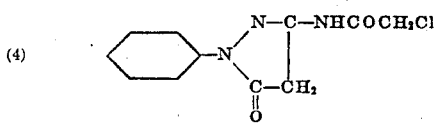
1-phenyl-3-chloroacetylamino-5-pyrazolone (5) 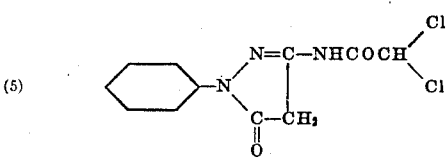
1-phenyl-3-dichloroacetylamino-5-pyrazolone (6) 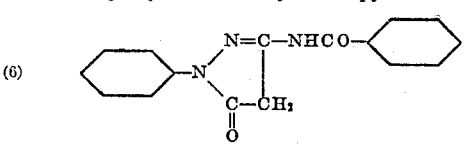
1-phenyl-3-benzoylamino-5-pyrazolone (7) 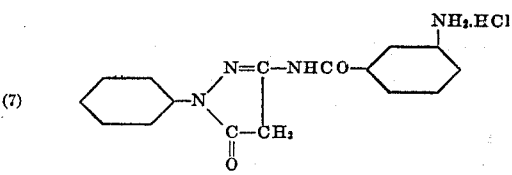
1-phenyl-3-(m-aminobenzoyl)-amino-5-pyrazolone hydrochloride (8) 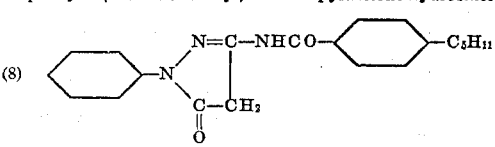
1-phenyl-3-(p-sec.amylbenzoyl-amino)-5-pyrazolone (9) 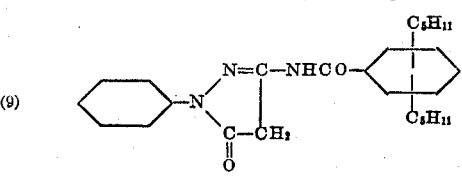
1-phenyl-3-(diamylbenzoyl)amino-5-pyrazolone

(10) 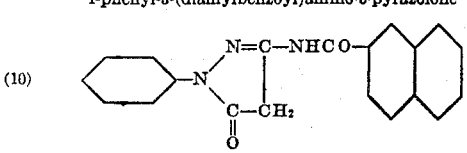
1-phenyl-3-β-naphthoylamino-5-pyrazolone

(11) 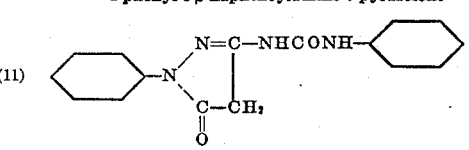
1-phenyl-3-phenylcarbamylamino-5-pyrazolone

(12) 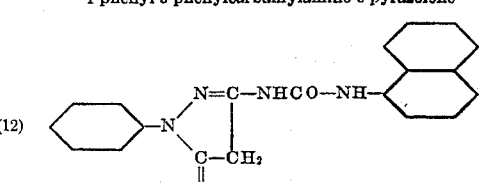
1-phenyl-3-α-naphthylcarbamylamino-5-pyrazolone

(13) 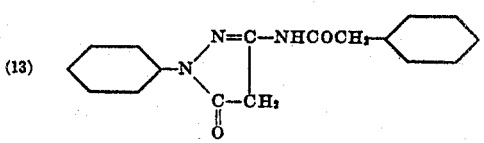
1-phenyl-3-phenylacetylamino-5-pyrazolone

(14) 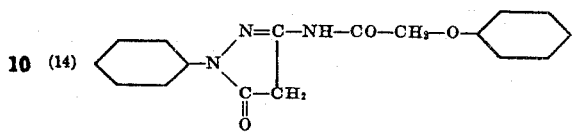
1-phenyl-3-phenoxyacetyl-amino-5-pyrazolone

(15) 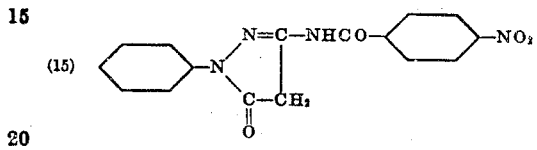
1-phenyl-3-p-nitrobenzoyl-amino-5-pyrazolone

(16) 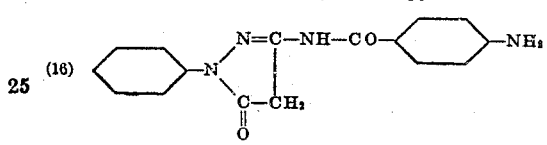
1-phenyl-3-p-aminobenzoyl-amino-5-pyrazolone

(17) 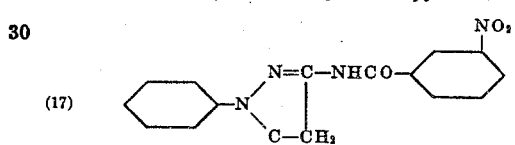
1-phenyl-3-m-nitrobenzoyl-amino-5-pyrazolone

(18) 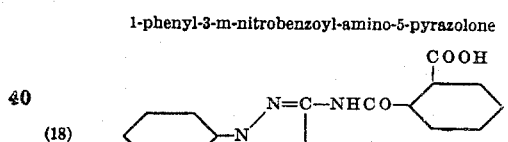
1-phenyl-3-(o-carboxy-benzoyl)-amino-5-pyrazolone

(19) 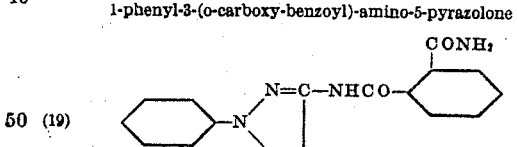
1-phenyl-3-(o-carbamyl-benzoyl)-amino-5-pyrazolone

(20) 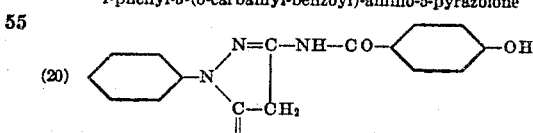
1-phenyl-3-(p-hydroxy-benzoyl)-amino-5-pyrazolone

(21) 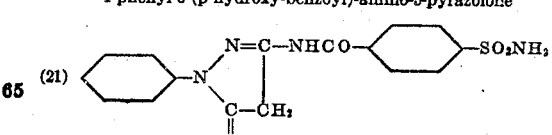
1-phenyl-3-(p-sulfamyl-benzoyl)-amino-5-pyrazolone

(22) 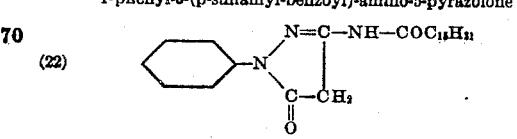
1-phenyl-2-palmitylamino-5-pyrazolone

(23) 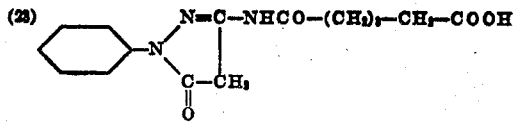
1-phenyl-3-(ω-carboxy-n-valeryl)-amino-5-pyrazolone

(24) 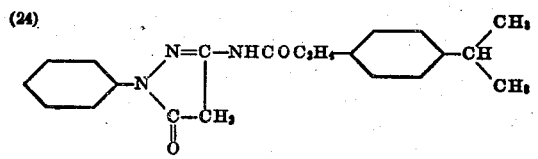
1-phenyl-3-[β(p-isopropylphenyl)-propionyl-amino]-5-pyrazolone

(25) 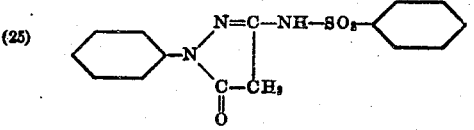
1-phenyl-3-benzene-sulfonylamino-5-pyrazolone

(26) 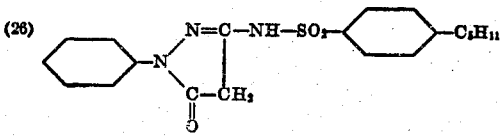
1-phenyl-3-(p-sec.amyl-benzenesulfonylamino)-5-pyrazolone

(27) 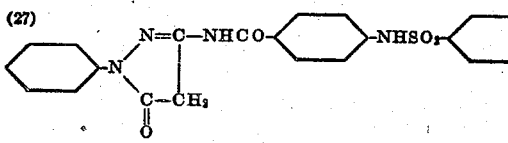
1-phenyl-3-(p-benzenesulfonamidobenzoylamino)-5-pyrazolone

(28) 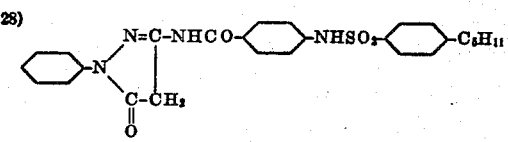
1-phenyl-3-([p-sec.amyl-benzenesulfonyl]p-aminobenzoyl)amino-5-pyrazolone

(29) 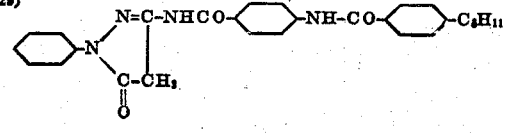
1-phenyl-3-[p-(p'-sec.amylbenzoyl)aminobenzoylamino] 5-pyrazolone

(30) 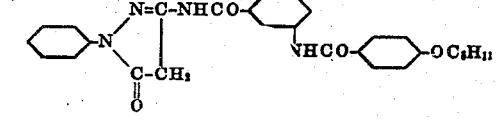
1-phenyl-3-(p-n-amyloxy benzoyl-m-amino-benzoyl)-amino-5-pyrazolone

(31) 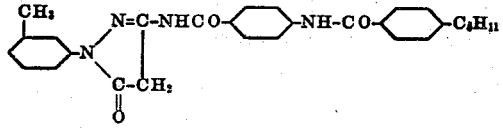
1-m-tolyl-3-[p-(p'-sec.amylbenzoyl)aminobenzoylamino]-5-pyrazolone

(32) 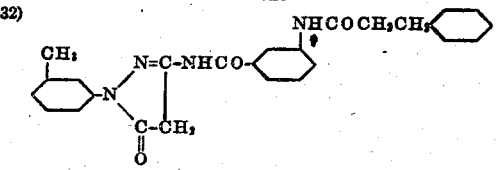
1-m-tolyl-3-[m-(β-phenyl-propionyl)aminobenzoylamino]-5-pyrazolone

(33) 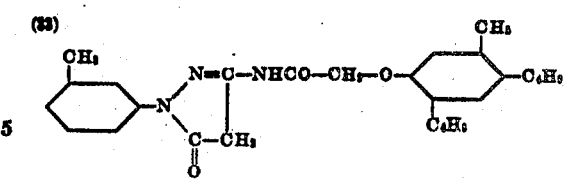
1-m-tolyl-3-(2, 4-di-tert.butyl-m-tolyloxyacetyl-amino)-5-pyrazolone

(34) 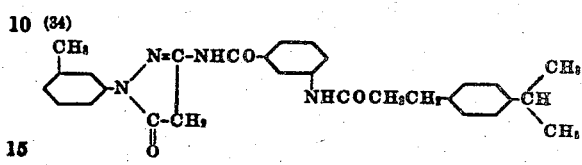
1-m-tolyl-3-(m[p'-iso-propyl-β-phenylpropionyl] aminobenzoyl)-amino-5-pyrazolone

(35) 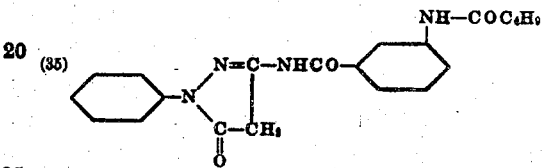
1-phenyl-3-[m-(n-valeryl-amino) benzoylamino]-5-pyrazolone

(36) 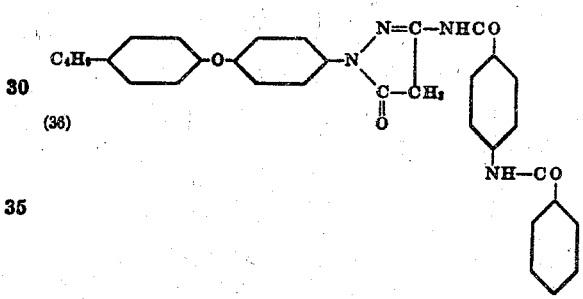
1-[p-(p'-tert.Butyl-phenoxy)-phenyl]-3-[p-(benzoylamino) benzoylamino]-5-pyrazolone

(37) 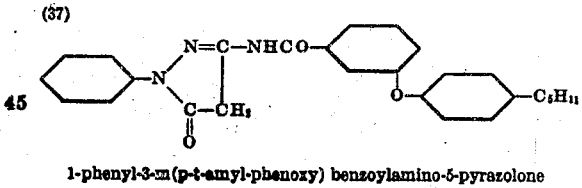
1-phenyl-3-m(p-t-amyl-phenoxy) benzoylamino-5-pyrazolone

(38) 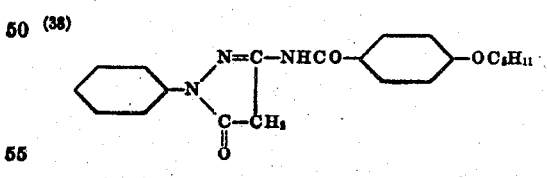
1-phenyl-3-(p-tert.-amyl-oxy-benzoylamino)-5-pyrazolone

(39) 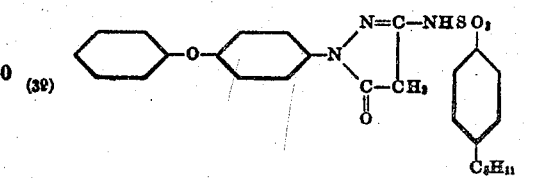
1-(p-phenoxyphenyl)-3-(p-sec. amylbenzenesulfonyl) amino-5-pyrazolone

(40) 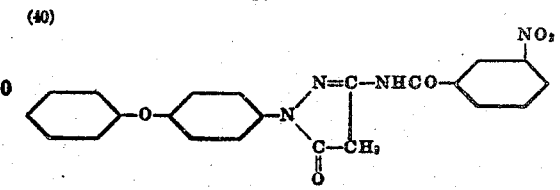
1 (p-phenoxyphenyl)-3-(m-nitrobenzoyl) amino-5-pyrazolone

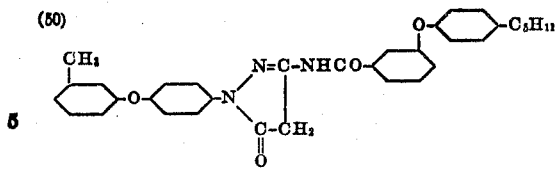
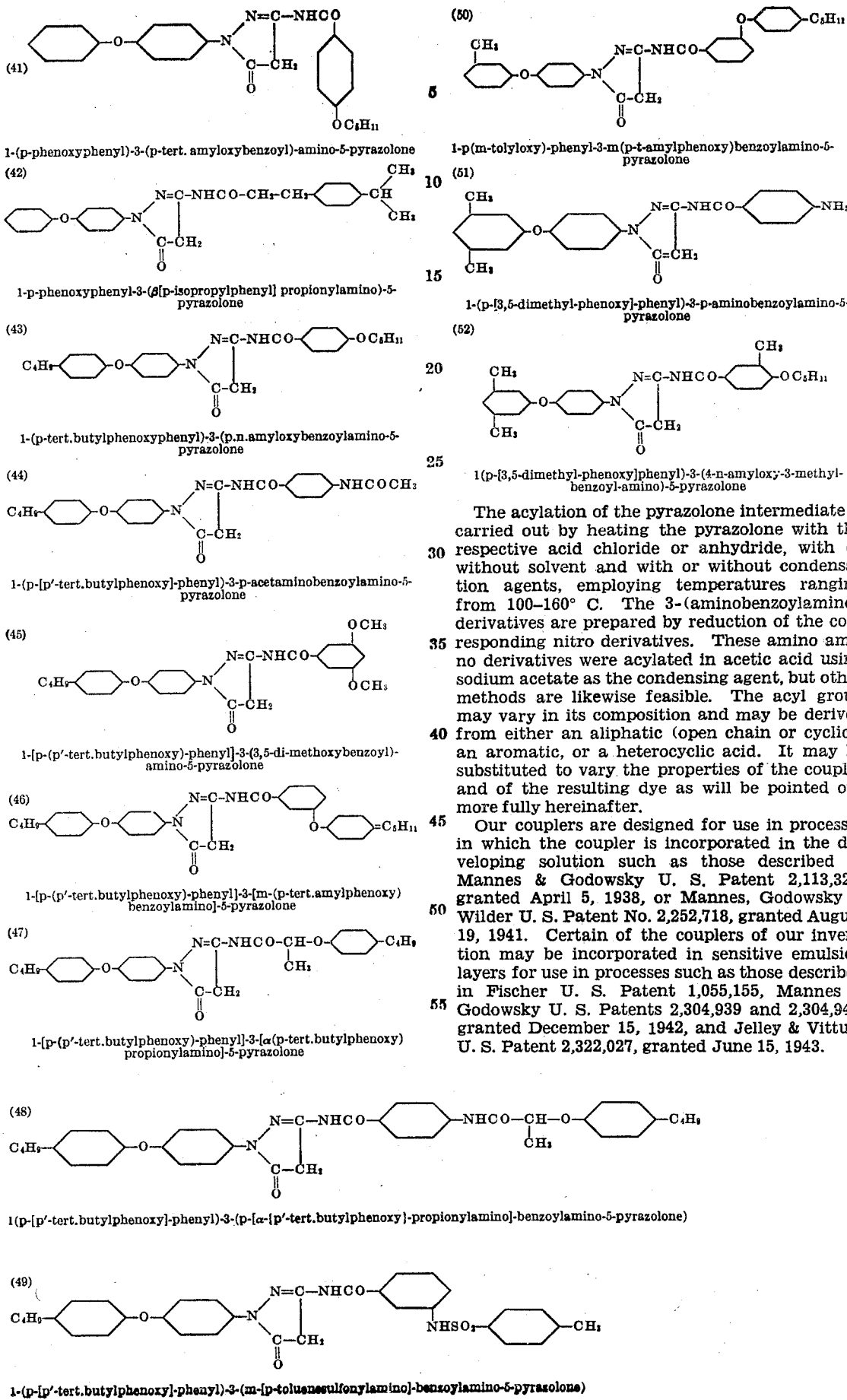

The acylation of the pyrazolone intermediate is carried out by heating the pyrazolone with the respective acid chloride or anhydride, with or without solvent and with or without condensation agents, employing temperatures ranging from 100–160° C. The 3-(aminobenzoylamino) derivatives are prepared by reduction of the corresponding nitro derivatives. These amino amino derivatives were acylated in acetic acid using sodium acetate as the condensing agent, but other methods are likewise feasible. The acyl group may vary in its composition and may be derived from either an aliphatic (open chain or cyclic), an aromatic, or a heterocyclic acid. It may be substituted to vary the properties of the coupler and of the resulting dye as will be pointed out more fully hereinafter.

Our couplers are designed for use in processes in which the coupler is incorporated in the developing solution such as those described in Mannes & Godowsky U. S. Patent 2,113,329, granted April 5, 1938, or Mannes, Godowsky & Wilder U. S. Patent No. 2,252,718, granted August 19, 1941. Certain of the couplers of our invention may be incorporated in sensitive emulsion layers for use in processes such as those described in Fischer U. S. Patent 1,055,155, Mannes & Godowsky U. S. Patents 2,304,939 and 2,304,940, granted December 15, 1942, and Jelley & Vittum U. S. Patent 2,322,027, granted June 15, 1943.

The following examples illustrate developing solutions containing the couplers used according to our invention:

*Example 1*

A

| | |
|---|---|
| 2-amino-5-diethylamino toluene hydrochloride _____grams | 2 |
| Sodium sulfite (anhydrous)_____do___ | 2 |
| Sodium carbonate (anhydrous)_____do___ | 20 |
| Potassium bromide_____do___ | 1 |
| Water to_____cc__ | 1,000 |

B

| | |
|---|---|
| 1-phenyl-3-acetylamino-5-pyrazolone _____grams__ | 2 |
| Sodium hydroxide (10% solution)_____cc__ | 10 |

B is added to A.

*Example 2*

A

| | |
|---|---|
| 2-amino-5-diethylamino toluene sulfate_____grams__ | 2.5 |
| Sodium sulfite (anhydrous)_____do___ | 5 |
| Sodium carbonate (anhydrous)_____do___ | 20 |
| Potassium bromide_____do___ | 2 |
| Water to_____cc__ | 1,000 |

B

| | |
|---|---|
| 1-phenyl-3-benzoylamino-5-pyrazolone_____grams__ | 3 |
| Isopropyl alcohol_____cc__ | 100 |

B is added to A.

The foregoing examples refer to the addition of the coupler compound to the developing solution itself. The coupler may also be added to the emulsion layer provided that suitable means are used to prevent its diffusion in the case of multi-layer coatings. Special dispersing agents may be used for incorporating the coupler compound in the emulsion and in certain cases the coupler may be absorbed or adsorbed to the sensitive salt or may be combined with the sensitive salt as a chemical combination. Certain of the coupler compounds described in the present application such as Nos. 22, 29, 31, 34, 36, 41, 43, 45, 46, 47, 48, 50, and 52 are in themselves non-diffusing and may be incorporated in the photographic layer without the use of additional agents to prevent diffusion. These couplers may also be incorporated in an emulsion layer according to the methods of Mannes & Godowsky U. S. Patent 2,304,940 and Jelley and Vittum U. S. Patent 2,322,027, referred to above.

As stated above, some of the couplers described in the present application are of value in the process of Jelley & Vittum U. S. Patent 2,322,027. In the process of that application the coupler is first dissolved in a water-insoluble high boiling organic crystalloidal material such as 1.2-dimethoxy-benzene or dimethyl phthalate, and the solution is then dispersed in the sensitive emulsion. One of the requirements of this process is that the coupler should have a high solubility in the coupler solvent or crystalloidal material so that a minimum amount of crystalloidal material is necessary. If only a dilute solution of the coupler can be used, a large volume of the coupler solution is needed to supply the required amount of coupler in the layer with the result that the coated emulsion layers are too thick. It has been found that the couplers having an ether group such as Nos. 33, 36, 38, 39, 41, 43 to 48, 50 and 52 have improved solubility in the coupler solvents ordinarily used in the process of the Jelley and Vittum Patent 2,322,027 and, therefore, are especially useful in that process.

One of the advantages of the couplers used according to our invention is that the dyes formed from them have greater stability to heat and light than those from couplers previously used. In the accompanying drawing a comparison is shown between a typical prior art coupler and a coupler of the present invention to indicate the improvement brought about by the couplers of the present invention. The coupler $\beta$-naphthoylacetonitrile is a typical prior art coupler which produces a magenta dye having desirable light absorption characteristics for purposes of color photography. It is described in British Patent 478,942. As shown in Fig. 1 of the drawing, this coupler, when used in a developing solution similar to that of Example I of the present application, produces a dye having the absorption characteristics of the curve A. After exposure of this dye from six hours on the Fade-O-Meter to high intensity visible and ultra-violet light, the dye had the absorption indicated by the curve B. Fig. 2 illustrates the dye obtained from the coupler 1-phenyl-3-benzoylamino-5-pyrazolone using the developer formula of Example 2 of the present application. This dye had the absorption characteristics indicated by the curve A and, after exposure for six hours on the Fade-O-Meter under conditions identical with those used in the exposure of the dyes of Fig. 1, the dye had the absorption indicated by B. The amount of fading or loss in absorption characteristics of the dye produced from the acylated pyrazolone was, therefore, much less than the fading produced in the case of the prior art compound.

We are aware that 1-phenyl-3-hydroxy-5-amino pyrazolone has been described in British Patent 478,990 as a coupler. However, acylated derivatives of this compound were not known prior to the invention described in our application Serial No. 412,244, filed September 25, 1941, and acylated derivatives of 1-aryl-3-amino-5-pyrazolones have been nowhere described. The acylated pyrazolones of our invention have greater blue light transmission and sharper absorption curves than the unsubstituted pyrazolone. Our novel compounds, therefore, possess the combined characteristics of high fastness to heat and light and desirable absorption characteristics for use in processes of multi-color photography.

In the development of exposed photographic silver halide emulsion layers, using the couplers of our invention, any color-forming developer containing a primary amino group may be used. These include developers having two primary amino groups as well as those having one of the amino groups substituted or having substituents in the ring such as alkyl phenylenediamines. These compounds are usually used in the salt form such as the hydrochloride or the sulfate which are more stable than the amines themselves. The suitable compounds are diethyl-p-phenylenediamine hydrochloride, monomethyl-p-phenylenediamine hydrochloride, dimethyl-p-phenylenediamine hydrochloride, and 2-amino-5-diethylaminotoluene hydrochloride. The p-amino phenols and their substitution products may also be used where the amino group is unsubstituted. All of these developers have an unsubstituted amino group which enables the oxidation products of the developer to couple with the color-forming compounds to form a dye image.

Our development process may be employed for the production of colored photographic images in layers of gelatin or other water permeable colloidal carriers, such as albumin, collodion, organic esters of cellulose, or synthetic resins. The carrier may be supported by a transparent medium such as glass, a cellulose ester or synthetic resin or a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example, in Mannes and Godowsky U. S. Patent No. 2,113,329.

The examples and compounds set forth in the present specification are illustrative only and it is to be understood that our invention is to be taken as limited only by the scope of the appended claims.

We claim:
1. A color forming photographic developer comprising a primary aromatic amino developing agent and a 3-acylamino-5-pyrazolone having its 4-position unsubstituted with an irreplaceable group.

2. A color forming photographic developer comprising a primary aromatic amino developing agent and a coupler compound having the probable formula:

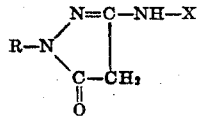

in which R is an aryl group and X is an acyl group.

3. A color forming photographic developer comprising a primary aromatic amino developing agent and a coupler compound having the probable formula:

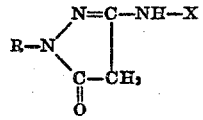

in which R is an aryl group and X is an acyl group derived from an aliphatic acid.

4. A color forming photographic developer comprising a primary aromatic amino developing agent and a coupler compound having the probable formula:

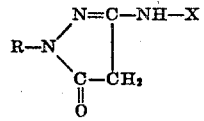

in which R is an aryl group and X is an acyl group derived from an aromatic acid.

5. A color forming photographic developer comprising a primary aromatic amino developing agent and a coupler compound having the probable formula:

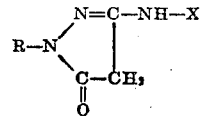

in which R is an aryl group and X is an acyl group derived from a benzoic acid.

6. A color forming photographic developer comprising a primary aromatic amino developing agent and a coupler compound having the probable formula:

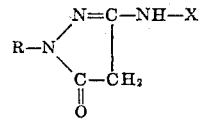

in which R is a phenyl radical and X is a benzoyl radical.

7. The method of producing a magenta colored photographic image in a gelatino-silver halide emulsion layer which comprises exposing the layer and developing it with a primary aromatic amino developing agent in the presence of a coupler compound having the probable formula:

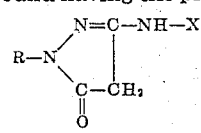

in which R is an aryl group and X is an acyl group.

8. The method of producing a magenta colored photographic image in a gelatino-silver halide emulsion layer which comprises exposing the layer and developing it with a primary aromatic amino developing agent in the presence of a coupler compound having the probable formula:

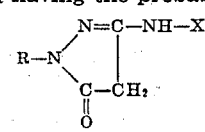

in which R is an aryl group and X is an acyl group derived from an aliphatic acid.

9. The method of producing a magenta colored photographic image in a gelatino-silver halide emulsion layer which comprises exposing the layer and developing it with a primary aromatic amino developing agent in the presence of a coupler compound having the probable formula:

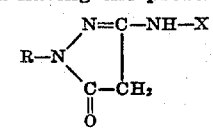

in which R is an aryl group and X is an acyl group derived from an aromatic acid.

10. The method of producing a magenta colored photographic image in a gelatino-silver halide emulsion layer which comprises exposing the layer and developing it with a primary aromatic amino developing agent in the presence of a coupler compound having the probable formula:

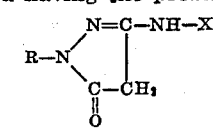

in which R is a phenyl radical and X is a benzoyl radical.

11. A photographic emulsion for forming colored images comprising a water-permeable, colloidal carrier containing a sensitive silver halide and a coupler compound having the probable formula:

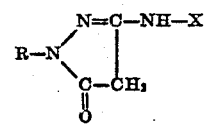

in which R is an aryl group and X is an acyl group.

12. A photographic emulsion for forming colored images comprising a water-permeable, colloidal carrier containing a sensitive silver halide and a coupler compound having the probable formula:

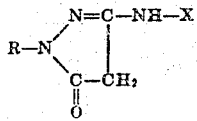

in which R is a phenyl radical and X is a benzoyl radical.

13. A photographic emulsion for forming colored images comprising a water-permeable, colloidal carrier containing a sensitive silver halide and a coupler compound having the probable formula:

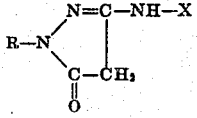

in which R is an aryl radical and X is a benzoyl radical and the compound contains an ether linkage in one of the substituents in a position selected from the group consisting of 1-position and 3-position.

14. A photographic emulsion for forming colored images comprising a water-permeable, colloidal carrier containing a sensitive silver halide and a coupler compound having the probable formula:

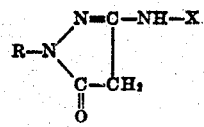

in which R is a phenoxy phenyl group and X is a benzoyl group.

15. A photographic emulsion for forming colored images comprising a water-permeable, colloidal carrier containing a sensitive silver halide and a coupler compound having the probable formula:

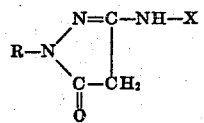

in which R is a phenoxy phenyl group and X is a benzoyl radical containing an ether linkage.

16. A photographic emulsion for forming colored images comprising a water-permeable, colloidal carrier containing a sensitive silver halide and a coupler compound having the probable formula:

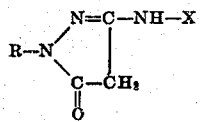

in which R is a p-tertiary butyl phenoxy phenyl group and X is a benzoyl radical containing an ether linkage.

HENRY D. PORTER.
ARNOLD WEISSBERGER.